(12) United States Patent
Kwon et al.

(10) Patent No.: US 8,982,813 B2
(45) Date of Patent: Mar. 17, 2015

(54) METHOD AND APPARATUS FOR TRANSMITTING SOUNDING REFERENCE SIGNAL

(75) Inventors: Yeong Hyeon Kwon, Anyang-si (KR); Jae Hoon Chung, Anyang-si (KR); Kyu Jin Park, Anyang-si (KR); Min Seok Noh, Anyang-si (KR); So Yeon Kim, Anyang-si (KR); Sung Ho Moon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 670 days.

(21) Appl. No.: 13/376,166

(22) PCT Filed: Jun. 3, 2010

(86) PCT No.: PCT/KR2010/003585
§ 371 (c)(1),
(2), (4) Date: Dec. 2, 2011

(87) PCT Pub. No.: WO2010/140859
PCT Pub. Date: Dec. 9, 2010

(65) Prior Publication Data
US 2012/0082124 A1    Apr. 5, 2012

Related U.S. Application Data

(60) Provisional application No. 61/300,429, filed on Feb. 1, 2010, provisional application No. 61/183,564, filed on Jun. 3, 2009.

(30) Foreign Application Priority Data

Jun. 3, 2010 (KR) .................. 10-2010-0052533

(51) Int. Cl.
*H04W 4/00*     (2009.01)
*H04L 5/00*     (2006.01)
*H04W 72/12*    (2009.01)

(52) U.S. Cl.
CPC .............. *H04L 5/0007* (2013.01); *H04L 5/005* (2013.01); *H04L 5/0091* (2013.01); *H04W 72/1273* (2013.01)
USPC ..................................................... 370/329

(58) Field of Classification Search
CPC ..... H04W 84/18; H04W 84/12; H04W 88/08; H04W 72/04; H04W 76/02
USPC .............. 370/310, 310.2, 313, 315, 328, 329, 370/338, 436
See application file for complete search history.

(56) References Cited

U.S. PATENT DOCUMENTS

| | | | |
|---|---|---|---|
| 8,238,405 B2* | 8/2012 | Mehta et al. | 375/133 |
| 8,467,367 B2* | 6/2013 | Malladi et al. | 370/343 |
| 2010/0165931 A1* | 7/2010 | Nimbalker et al. | 370/329 |
| 2011/0110267 A1* | 5/2011 | Gallant | 370/254 |

FOREIGN PATENT DOCUMENTS

| | | |
|---|---|---|
| KR | 1020080005036 | 1/2008 |
| KR | 1020080088525 | 10/2008 |
| KR | 1020090026019 | 3/2009 |

* cited by examiner

*Primary Examiner* — Anh Ngoc Nguyen
(74) *Attorney, Agent, or Firm* — Lee, Hong, Degerman, Kang & Waimey

(57) ABSTRACT

The present invention relates to a method for transmitting a sounding reference signal from a terminal in a wireless communication system, the method comprising: receiving resource operation information, which includes resource allocation information for channel sounding, from a base station; and transmitting the sounding reference signal through the entire or part of a resource region that is allocated for transmission of a demodulation reference signal on a physical uplink shared channel (PUSCH) according to the resource operation information.

8 Claims, 12 Drawing Sheets

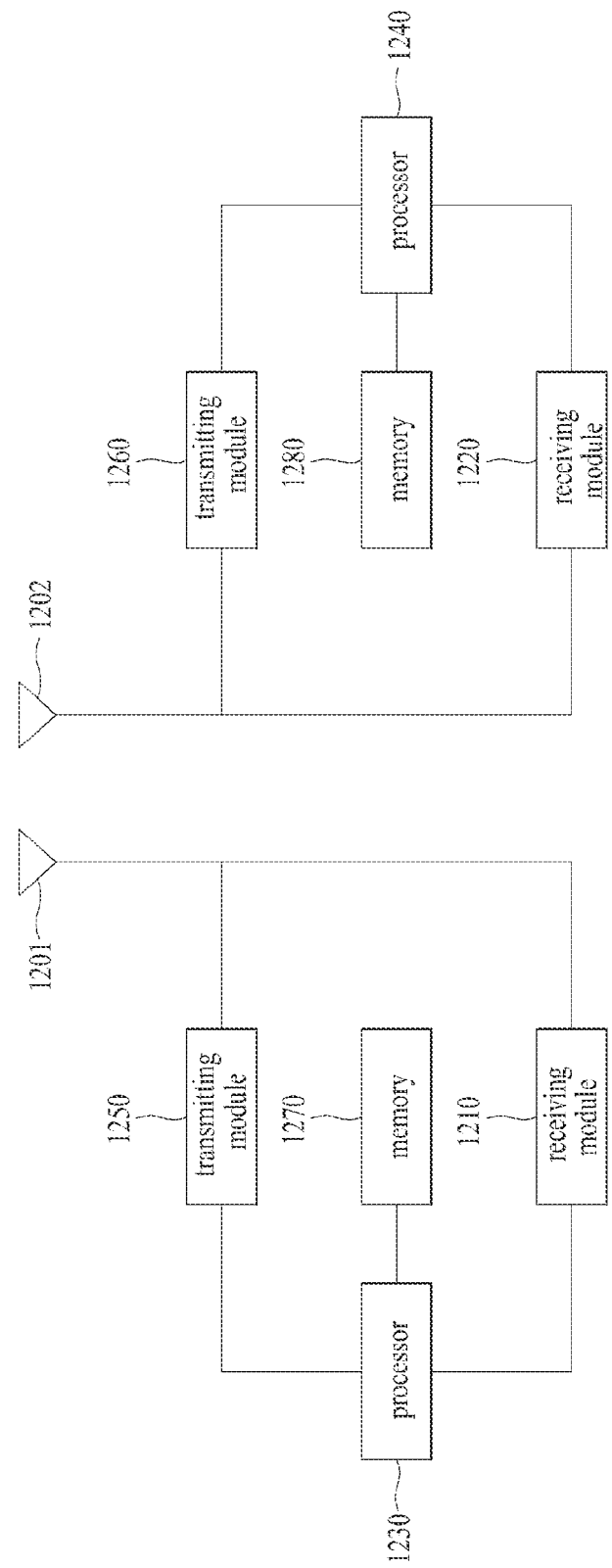

METHOD AND APPARATUS FOR TRANSMITTING SOUNDING REFERENCE SIGNAL

CROSS-REFERENCE TO RELATED APPLICATIONS

This application is National Stage filing under 35 U.S.C. 371 of International Application No. PCT/KR2010/003585, filed on Jun. 3, 2010, which claims the benefit of earlier filing date and right of priority to Korean Application No. 10-2010-0052533, filed on Jun. 3, 2010, and also claims the benefit of U.S. Provisional Application Nos. 61/300,429, filed on Feb. 1, 2010, and 61/183,564, filed on Jun. 3, 2009, the contents of which are incorporated by reference herein in their entirety.

TECHNICAL FIELD

The present invention relates to a method of transmitting a reference signal in a mobile communication system, and more particularly, to a method and apparatus for increasing resource efficiency in transmitting a sounding reference signal.

BACKGROUND ART

Wireless communication systems are widely deployed to provide various types of communication services such as voice or data services. A general wireless communication system is a multiple access system that can support communication with multiple users through access to available shared system resources (bandwidth, transmit power, etc.). As examples of such a multiple access system, there exist a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system and a multi-carrier frequency division multiple access (MC-FDMA) system, etc. In a wireless communication system, a terminal may receive information from a base station via a downlink (DL), and transmit information to the base station on an uplink (UL). The terminal transmits or receives information such as data and various control information, and there exist a variety of physical channels in accordance with the types and uses of the information transmitted or received by the terminal.

As a channel between a transmitting end and a receiving end is not fixed in a wireless mobile communication system, the channel between a transmitting antenna and a receiving antenna requires frequent measurement. When an agreed signal is transmitted/received between the transmitting end and the receiving end so as to measure the channel, an amount of amplitude reduction and a phase shift value caused by the channel can be detected, and the thus-detected information can be fed back to the transmitting side. Otherwise, the detected information can be used to reliably detect data information which is not agreed and decode the detected data information. The agreed signal between the transmitting end and the receiving end may refer to a reference signal, a pilot signal or a sounding reference signal.

As an example of a mobile communication system to which the present invention can be applied, a $3^{rd}$ Generation Partnership Project Long Term Evolution (3GPP LTE, hereinafter, referred to as "LTE") mobile communication system will be roughly described.

FIG. 1 illustrates an example of a mobile communication system, in which an E-UMTS network configuration is schematically shown. Evolved Universal Mobile Telecommunications System (E-UMTS) has evolved from an existing Universal Mobile Telecommunications System (UMTS), and basic standardization is underway in the 3GPP. Generally, E-UMTS may be referred to as a long term evolution (LTE) system. For a detailed description on the technical specifications of UMTS and E-UMTS, $3^{rd}$ Generation Partnership Project; Technical Specification Group Radio Access Network Release 7 and Release 8 can be referred to.

Referring to FIG. 1, E-UMTS includes user equipment (UE) 120, base stations (eNode B;eNB) 110*a* and 110*b*, and access gateways (AGs) located at an end point of a network (i.e., E-UTRAN) and connected to an external network. The base station may transmit multiple data streams at one time for a broadcast service, a multicast service and/or a unicast service.

At least one cell exists per base station. Each cell is set to one of bandwidths of 1.25, 2.5, 5, 10, 15 and 20 Mhz, and provides a downlink or uplink transmission service to each terminal. Different cells can be set to provide different bandwidths. Each base station controls data transmission/reception to/from a plurality of terminals. For downlink (DL) data, each base station transmits downlink scheduling information to relevant terminals so that the terminals can receive information regarding a scheduled time for data transmission/frequency domain, encoding, data size and hybrid automatic repeat request (HARQ). For uplink (UL) data, each base station transmits uplink scheduling information to relevant terminals so that the terminals can receive information on an available time slot/frequency domain, encoding, data size and hybrid automatic repeat and request (HARQ). An interface for transmission of user traffic or control traffic can be used between base stations. A core network (CN) can be constituted by network nodes for AGs and user registration of a terminal. AGs manage the mobility of the terminal on the basis of tracking areas (TAs) which consist of a plurality of cells.

Wireless communication techniques have now been developed to LTE based upon WCDMA, however, level of requests and expectation of users and enterprises are steadily increasing. Moreover, other wireless access techniques are continuously being developed, and therefore, evolution to new techniques is required for future competitiveness. In this context, per-bit cost reduction, increase in service availability, flexible use of frequency band, simple configuration, open interface and appropriate power consumption of a terminal are required.

Recently, progress has been made by 3GPP in standardization for the technique to supersede LTE. This technique will be referred to as "LTE-Advanced" or "LTE-A" throughout this description. One of the main differences between an LTE system and an LTE-A system is system bandwidth. The LTE-A system aims to support a broadband of a maximum of 100 MHz. For this, the LTE-A system employs carrier aggregation or bandwidth aggregation which uses a plurality of frequency blocks to achieve broadband. Carrier aggregation uses a plurality of frequency blocks as a single large logical frequency band so as to use a wider frequency band. The bandwidth of each frequency block can be defined based on the bandwidth of the system block used in the LTE system. Each frequency block is transmitted using a component carrier.

DISCLOSURE

Technical Problem

Therefore, it is an object of the present invention to provide a method which can effectively transmit a sounding reference signal in a wireless communication system.

Another object of the present invention is to provide a method which uses a demodulation reference signal (DM-RS) resource used in a wireless communication system, in transmitting a sounding reference signal, to thereby perform efficient resource management.

Another object of the present invention is to provide a method which operates resources in such a manner as to efficiently transmit a sounding reference signal even when the number of antennas increases in a wireless communication system.

It should be appreciated that the technical objects of the present invention are not intended to be limited by those described above, and other technical objects which are not disclosed herein will be readily apparent to those skilled in the art from the detailed description set forth below.

Technical Solution

According to one embodiment of the present invention, there is provided a method of transmitting a sounding reference signal by a terminal in a wireless mobile communication system, the method including receiving resource operation information including resource allocation information for channel sounding from a base station, and selectively transmitting a demodulation reference signal or the sounding reference signal through a whole or a portion of a resource region allocated for transmission of the demodulation reference signal in a subframe including a plurality of SC-FDMA symbols according to the resource operation information.

The method may further include receiving indication information indicating whether to transmit the sounding reference signal, from the base station, and the demodulation reference signal or the sounding reference signal is generated and transmitted in accordance with the indication information.

The indication information may further symbol include information on a symbol for the modulation reference signal, used for transmitting the sounding reference signal.

The resource allocation information for channel sounding may include information on the resource region for transmission of the demodulation reference signal.

The terminal may selectively transmit uplink data during transmission of the sounding reference signal in accordance with whether the resource operation information includes resource region allocation information for data transmission.

According to another embodiment of the present invention, there is provided a method of performing channel sounding by a base station in a wireless mobile communication system, the method including scheduling an available resource region of the system, the scheduling including resource allocation for channel sounding, transmitting resource operation information obtained in the scheduling to a terminal, and receiving, from the terminal, a demodulation reference signal or a sounding reference signal through a whole or a portion of a resource region allocated for transmission of the demodulation reference signal in a subframe including a plurality of SC-FDMA symbols according to the resource operation information.

The channel sounding method may further include transmitting, to the terminal, indication information indicating whether to transmit the sounding reference signal, wherein the indication information instructs the terminal to transmit the demodulation reference signal or the sounding reference signal in the resource region allocated for transmission of the demodulation reference signal.

The indication information may further include information on a symbol for the modulation reference signal, used for transmitting the sounding reference signal.

The scheduling the resource region may include the base station multiplexing the resource region allocated for transmission of two or more demodulation reference signals into a resource region for channel sounding.

The scheduling the resource region may include the base station selectively allocating a resource region for data transmission.

The channel sounding method may include performing channel sounding using the sounding reference signal received from the terminal.

According to another embodiment of the present invention, there is provided a terminal in a wireless mobile communication system, including a receiving module for receiving a wireless signal, a transmitting module for transmitting the wireless signal, and a processor for controlling a process of transmitting one or more sounding reference signals on a physical uplink shared channel (PUSCH) through the transmitting module in accordance with resource operation information which includes resource allocation information for channel sounding, received through the receiving module, wherein the processor controls a process of transmitting the sounding reference signals through a whole or a portion of a resource region allocated for transmission of a demodulation reference signal, according to the resource operation information and indication information indicating whether to transmit the sounding reference signals, received through the receiving module.

According to another embodiment of the present invention, there is provided a base station in a wireless mobile communication system, including a receiving module for receiving a wireless signal, a transmitting module for transmitting the wireless signal, and a processor for controlling a process of scheduling an available resource region of the system, including resource allocation for channel sounding, generating resource operation information according to the resource region scheduling, and transmitting the resource operation information to a terminal through the transmitting module, wherein the processor controls a process of scheduling to enable a resource region allocated for channel sounding to include a whole or a portion of a resource region allocated for transmission of a demodulation reference signal on a physical uplink shared channel (PUSCH), and performing channel sounding using a sounding reference signal received from the terminal through the receiving module.

It is to be understood that the foregoing exemplary embodiments are merely a part of embodiments of the present invention, and a variety of embodiments to which technical features of the present invention are applicable will be provided and understood by those skilled in the art, based on the detailed description of the invention given below.

Advantageous Effects

According to embodiments of the present invention, various control information can be efficiently transmitted in a wireless communication system.

According to embodiments of the present invention, a demodulation reference signal (DM-RS) resource is used for transmitting a sounding reference signal, thus enabling a terminal having a plurality of antennas to efficiently transmit a sounding reference signal.

It should be appreciated that the technical objects of the present invention are not intended to be limited by those described above, and other technical objects which are not disclosed herein will be readily understood by those skilled in the art from the detailed description set forth below.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

FIG. 12 is a block diagram illustrating a base station and a terminal for performing embodiments of the present invention.

BEST MODE

Figure 1:
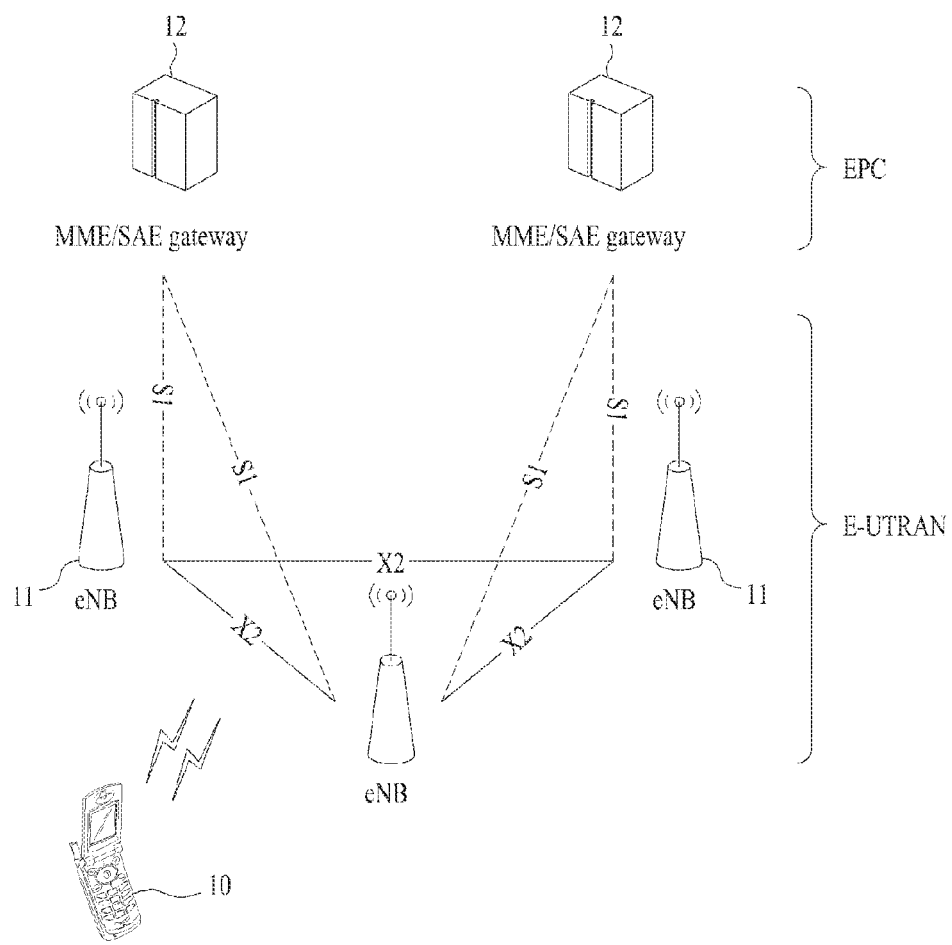
FIG. 1 is a schematic view illustrating an E-UMTS network configuration as an example of a mobile communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given in detail under the assumption that a mobile communication system is a 3GPP LTE system, however, the present invention is applicable to any other mobile communication system except for unique matters of 3GPP LTE.

In some cases, a detailed description of known configurations and apparatuses will be omitted or shown in the form of a block diagram focusing on the key functions of each configuration and apparatus when it may make the concept of the present invention rather unclear. In addition, the same reference numerals will be used throughout the description to refer to the same or like components.

In the description below, the term "terminal" refers to mobile or fixed user devices such as user equipment (UE), a mobile station (MS), and an advanced mobile station (AMS), and the term "base station" refers to a random node of a network that communicates with a terminal, such as a Node B, eNode B, base station, access point (AP), etc.

The techniques described below can be used in various wireless access technologies such as code division multiple access (CDMA), frequency division multiple access (FDMA), time division multiple access (TDMA), orthogonal frequency division multiple access (OFDMA), single carrier frequency division multiple access (SC-FMDA), etc. CDMA may be implemented with a radio technology such as universal terrestrial radio access (UTRA) or CDMA2000. TDMA may be implemented with a radio technology such as Global System for Mobile communications (GSM)/General Packet Radio Service (GPRS)/Enhanced Data Rates for GSM Evolution (EDGE). OFDMA may be implemented with a radio technology such as IEEE 802.11 (Wi-Fi), IEEE 802.16 (WiMAX), IEEE 802-20, E-UTRA (evolved UTRA), etc. UTRA is a part of a universal mobile telecommunications system (UMTS). $3^{rd}$ generation partnership project (3GPP) long term evolution (LTE) is a part of evolved UMTS (E-UMTS) that uses E-UTRA, and employs OFDMA in a downlink and employs SC-FDMA in an uplink. LTE-Advanced (A) is evolved version of 3GPP LTE.

Although the description of the present invention is focused on 3GPP LTE/LTE-A for clarification of description, the technical idea of the present invention is not limited thereto.

In a mobile communication system, user equipment receives information from a base station through a downlink, and transmits information through an uplink. The user equipment transmits or receives information such as data or various control information, and there exist a variety of physical channels in accordance with the types and uses of the information that the user equipment transmits or receives.

Figure 2:
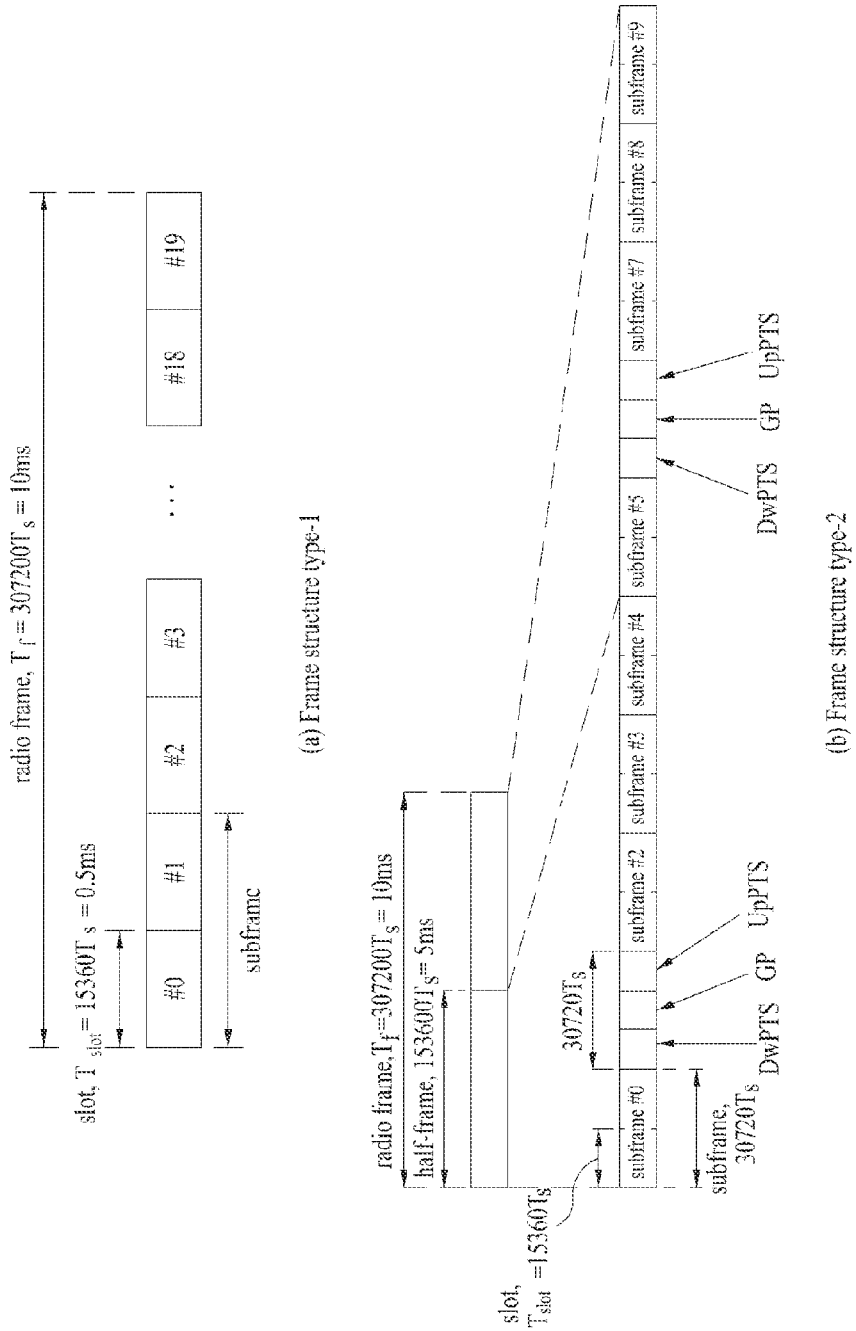
FIG. 2 illustrates a radio frame structure used in 3GPP LTE.

FIG. 2 illustrates a radio frame structure used in LTE.

Referring to FIG. 2, a radio frame has a length of 10 ms ($327200*T_s$), and includes 10 subframes of equal size. Each subframe has a length of 1 ms, and has two slots each of which has a length of 0.5 ms. Ts represents sampling time, and is expressed as $Ts=1/(15\ kHz*2048)=3.2552*0^{-8}$ (approximately 33 ns). Each slot includes a plurality of orthogonal frequency division multiplexing (OFDM) (or SC-FDMA) symbols in a time domain, and a plurality of resource blocks (RBs) in a frequency domain. One resource block includes 12 subcarriers*7(6) OFDM (or SC-FDMA) symbols in an LTE system. Frame structure types 1 and 2 are used in FDD and TDD, respectively. The frame structure type 2 includes two half frames, and each half frame includes five subframes, a downlink pilot time slot (DwPTS), a guard period (GP), and an uplink pilot time slot (UpPTS). The above description of the radio frame structure is merely exemplary, and the number/length of the subframes, slots or OFDM (or SC-FDMA) symbols may vary.

Figure 3:
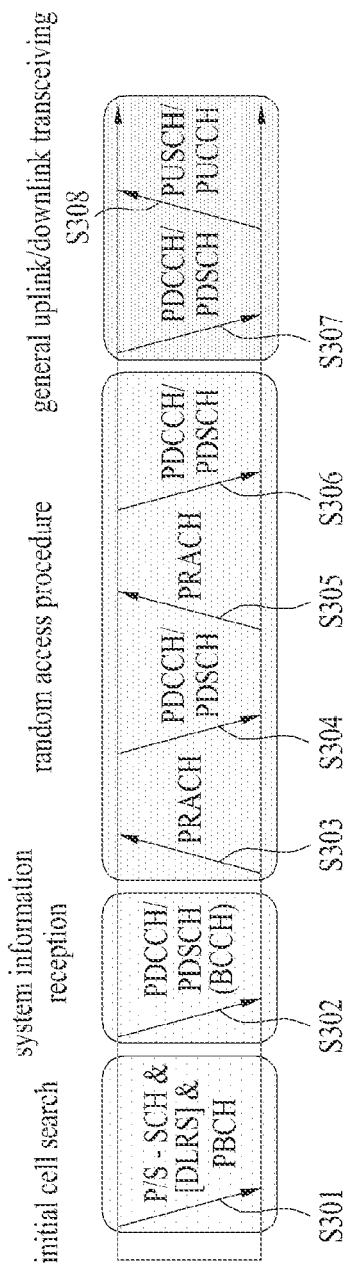
FIG. 3 illustrates physical channels in a 3GPP LTE system and signal transmission using the channels.

FIG. 3 illustrates physical channels used in a 3GPP system and a general method of transmitting signals using the channels.

Referring to FIG. 3, user equipment performs an initial cell search process such as synchronization with a base station when power is turned on or when the user equipment enters a new cell (S310). For this, the user equipment receives a primary synchronization channel (P-SCH) and a secondary synchronization channel (S-SCH) from the base station, synchronizes with the base station, and acquires information such as cell ID. Then, the user equipment receives a physical broadcast channel from the base station to acquire broadcast information in a cell. Meanwhile, the user equipment receives a downlink reference signal in the initial cell search step, and checks a downlink channel state.

The user equipment which has finished the initial cell search process receives a physical downlink control channel (PDCCH) and a physical downlink shared channel (PDSCH) in accordance with the information carried on the PDCCH to as to thereby acquire more detailed system information (S320).

Meanwhile, in the case where the user equipment accesses the base station for the first time or if there exists no radio resources for signal transmission, the user equipment performs a random access procedure (RACH) to gain access to the base station (steps S330 to S360). For this, the user equipment transmits a specific sequence in a preamble through a physical random access channel (PRACH) (steps S330 and S350), and receives a response message to the preamble through PDCCH and PDSCH corresponding to the PDCCH. (steps S340 and S360). In contention-based RACH, an additional contention resolution procedure may be performed.

After completion of the above-enumerated procedures, the user equipment performs a general uplink/downlink signal transmission procedure such as receiving a PDCCH/PDSCH (S370) and transmitting a physical uplink shared channel (PUSCH)/physical uplink control channel (PUCCH) (S380). Control information that the user equipment transmits to the base station through an uplink or receives from the base station includes a downlink/uplink ACK/NACK signal, a channel quality indicator (CQI), a precoding matrix index (PMI), a rank indicator (RI), etc.

Figure 4:
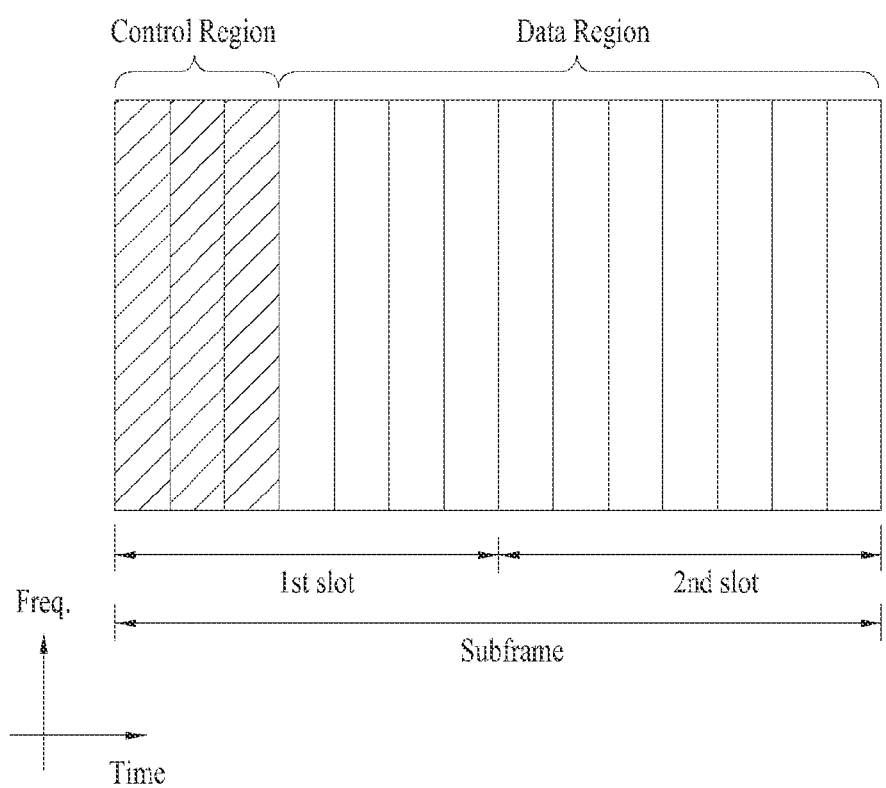
FIG. 4 illustrates a downlink subframe structure.

FIG. 4 illustrates a downlink subframe structure.

Referring to FIG. 4, one subframe has two slots in a time domain. The first three OFDM symbols of a first slot of the subframe constitute a control region to which control channels are allocated, and the rest of the OFDM symbols constitutes a data region to which physical downlink shared channels (PDSCHs) are allocated.

Physical downlink control channels used in 3GPP LTE include a physical control format indicator channel (PCFICH), a physical downlink control channel (PDCCH), a physical hybrid-ARQ indicator channel (PHICH), etc. PCFICH transmitted in a first OFDM symbol of a subframe carries information on the number of OFDM symbols (i.e., the size of a control region) used for transmission of control channels in the subframe. The control information transmitted through PDCCH is called downlink control information (DCI). The DCI indicates uplink resource allocation information, downlink resource allocation information, uplink transmit power control commands for random user equipment groups, etc. PHICH carries an acknowledgement/negative-acknowledgement (ACK/NACK) signal to an uplink hybrid automatic repeat request. That is, the ACK/NACK signal to the uplink data transmitted from the user equipment is transmitted over PHICH.

Now, a physical downlink control channel (PDCCH) will be described.

PDCCH may carry resource allocation and a transmission format (referred to as a downlink grant) of PDSCH, resource allocation information (referred to as an uplink grant) of PUSCH, a set of transmit power control commands for each user equipment of a random user equipment group and Voice over Internet Protocol (VoIP) activation, etc. A plurality of PDCCHs may be transmitted in a control region, and user equipment may monitor the PDCCHs. Each PDCCH is composed of one or an aggregation of several consecutive control channel elements (CCEs). The PDCCH composed of one or an aggregation of several consecutive CCEs is subblock interleaved, and transmitted through a control region. CCE is a logical allocation unit for providing PDCCH with a coding rate according to a radio channel state. CCE corresponds to a plurality of resource element groups. A format of PDCCH and the number of bits of an available PDCCH are determined in accordance with the relationship between the number of CCEs and the coding rate provided by CCEs.

Control information transmitted through PDCCH is referred to as downlink control information (DCI). Table 1 shows DCI according to a DCI format.

TABLE 1

| DCI Format | Description |
|---|---|
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword used for the compact scheduling of one PDSCH codeword with |
| DCI format 1D | precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 indicates uplink resource allocation information, DCI formats 1 and 2 indicate downlink resource allocation information, and DCI formats 3 and 3A indicate uplink transmit power control commands for random user equipment groups.

Figure 5:
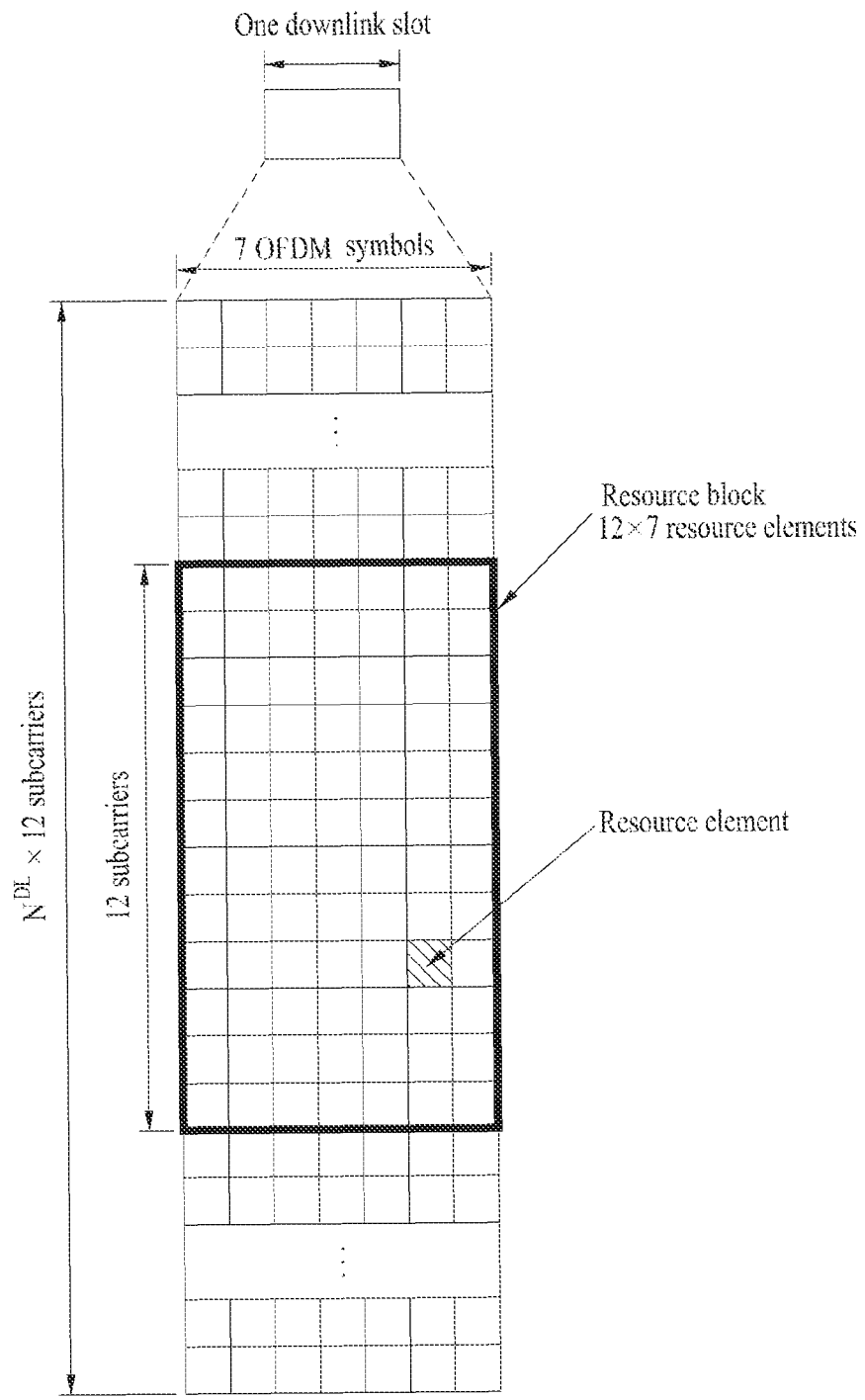
FIG. 5 illustrates a time-frequency resource grid structure of a downlink used in a 3GPP LTE system.

FIG. 5 illustrates a time-frequency resource grid structure of a downlink used in a 3GPP LTE system which is an example of a mobile communication system;

Referring to FIG. 5, the downlink signal transmitted from each slot can be described by a resource grid shown in FIG. 1, including $N_{RB}^{DL} * N_{SC}^{RB}$ subcarriers and $N_{symb}^{DL}$ OFDM symbols, where $N_{RB}^{DL}$ represents the number of resource blocks (RBs) in a downlink, $N_{SC}^{RB}$ represents the number of subcarriers constituting one RB, and $N_{symb}^{DL}$ represents the number of OFDM symbols in one downlink slot. The size of $N_{RB}^{DL}$ varies depending on the downlink transmission bandwidth constituted in a cell, and should satisfy $N_{RB}^{min,DL} \leq N_{RB}^{DL} \leq N_{RB}^{max,DL}$, where $N_{RB}^{min,DL}$ is the smallest downlink bandwidth supported by a wireless communication system, and $N_{RB}^{max,DL}$ is the largest downlink bandwidth supported by a wireless communication system. $N_{RB}^{min,DL}=6$, and $N_{RB}^{max,DL}=110$, however, the present invention is not limited thereto. The number of OFDM symbols contained in one slot may vary depending on the length of cyclic prefix (CP) and spacing between subcarriers. In case of multi-antenna transmission, one resource grid may be defined for each antenna port.

Each element in the resource grid for each antenna port is referred to as a resource element (RE), and is uniquely identified by an index pair in a slot. In this case, k represents an index in a frequency domain and l represents an index in a time domain, and k has a value of any one of $0, \ldots, N_{RB}^{DL} N_{SC}^{RB}-1$, and l has a value of any one of $0, \ldots, N_{symb}^{DL}-1$.

The resource block (RB) shown in FIG. 5 is used for describing the mapping relationship between a physical channel and resource elements. The resource block (RB) may be classified into a physical resource block (PRB) and a virtual resource block (VRB).

One PRB is defined by $N_{symb}^{DL}$ consecutive OFDM symbols in a time domain and $N_{SC}^{RB}$ consecutive subcarriers in a frequency domain. In this case, each of $N_{symb}^{DL}$ and $N_{SC}^{RB}$ may have a predetermined value. For instance, $N_{symb}^{DL}$ and $N_{SC}^{RB}$ may have values shown in Table 1. Accordingly, one PRB is made up of $N_{symb}^{DL} \times N_{SC}^{RB}$. One PRB may correspond to one slot in a time domain, and to 180 kHz in a frequency domain, but is not limited thereto.

TABLE 2

| $N_{SC}^{RB}$ |
|---|
| 12 |
| 24 |

The PRB has values of 0 to $N_{RB}^{DL-1}$ in a frequency domain. The relationship between PRB number $n_{PRB}$ in a frequency domain and resource elements (k,l) in one slot satisfies $$n_{PRB} = \left\lfloor \frac{k}{N_{SC}^{RB}} \right\rfloor.$$

The size of the VRB may be the same as that of the PRB. VRB may be classified into a localized VRB (LVRB) and a distributed VRB (DVRB). For both types of VRBs, the same VRB number is allocated to a VRB pair in two slots of one subframe.

The size of the VRB may be the same as that of PRB. There are two types of VRBs, that is, a localized VRB (LVRB) and a distributed VRB (DVRB). For both types of VRBs, a pair of VRBs may have the same VRB index (this may hereinafter be referred to as VRB number), and is allocated over two slots in one subframe. In other words, any one index among 0 to $N_{RB}^{DL-1}$ is allocated to each of $N_{RB}^{DL}$ VRBs which belong to a first slot of the two slots constituting one subframe, and similarly, any one index among 0 to $N_{RB}^{DL-1}$ is allocated to each of $N_{RB}^{DL}$ VRBs which belong to a second slot of the two slots.

Figure 6:
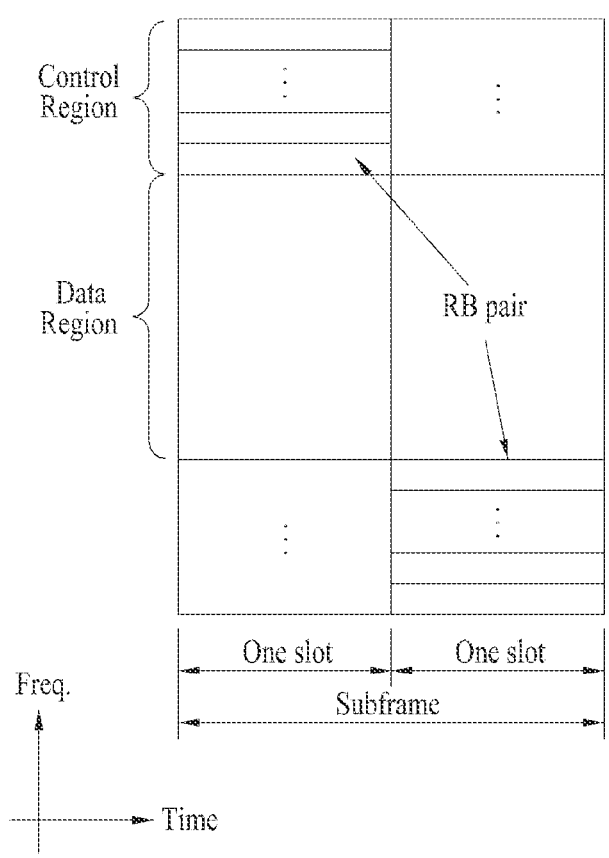
FIG. 6 illustrates an uplink subframe structure.

FIG. 6 illustrates an uplink subframe structure used in LTE.

Referring to FIG. 6, the uplink subframe includes a plurality of slots (for example, two slots). The uplink subframe is divided into a data region and a control region on a frequency domain. The data region includes a physical uplink shared channel (PUSCH) and is used in transmitting data signals such as voice, image, etc., and the control region includes a physical uplink control channel (PUCCH) and is used in transmitting control information. PUCCH includes an RB pair positioned at both ends of the data region on a frequency axis, and hops in a slot boundary. The control information includes hybrid automatic retransmit request (HARQ) ACK/NACK, and channel information on a downlink (hereinafter, referred to as "downlink channel information" or "channel information"). The downlink channel information includes CQI, PMI, RI, etc. A base station determines time/frequency resources, modulation schemes, coding rates and the like suitable for transmitting data to each user equipment, using the downlink channel information received from each user equipment.

In an LTE system, channel information includes CQI, PMI, RI, etc., and all or a portion of CQI, PMI, RI is transmitted depending on the transmission mode of each user equipment. Periodic transmission of channel information is referred to as periodic reporting, and transmission of channel information, performed by a request from a base station, is referred to as aperiodic reporting. In aperiodic reporting, the request bit included in the uplink scheduling information provided by the base station is transmitted to the user equipment. Then, the user equipment transmits channel information in consideration of a transmission mode thereof to the base station through an uplink data channel (PUSCH). In periodic reporting, a period, and an offset or the like in the relevant period are signaled for each user equipment in a semi-static manner on a subframe basis through an upper layer signal. Each user equipment periodically transmits channel information in consideration of a transmission mode to the base station through a physical uplink control channel (PUCCH). When uplink data is present in the subframe for transmitting channel information, channel information is transmitted together with the uplink data through a physical uplink control channel (PUCCH). The base station transmits, to each user equipment, transmission timing information suitable for each user equipment in consideration of the channel state of each user equipment and user equipment distribution in a cell. The transmission timing information contains a period, an offset or the like for transmitting channel information, and can be transmitted to each user equipment via a radio resource control (RRC) message.

In general, an LTE-A system may use increased number of new network components such as an antenna and a relay, as compared with an LTE system. The LTE-A system including the new network components may provide the ability to support an access to an LTE-A user equipment, and also an ability to maintain performance of a legacy system such as an LTE system.

A sounding reference signal may serve as a signal which can be used when a base station estimates a channel state from each user equipment to the base station.

The sounding reference signal is a reference signal that may be used in uplink channel measurement, and also is a pilot signal which is transmitted from each user equipment to the base station to be used when the base station estimates a channel state from each user equipment to the base station. A channel for transmitting the sounding reference signal (hereinafter, referred to as "channel sounding channel") may have different transmission bandwidths and different transmission periods depending on the condition of each user equipment.

The base station may determine, for every subframe, which data channel of user equipment to be scheduled based on the result of the channel estimation.

Hereinafter, the sounding reference signal refers to a channel sounding signal or a sounding signal.

Figure 7:
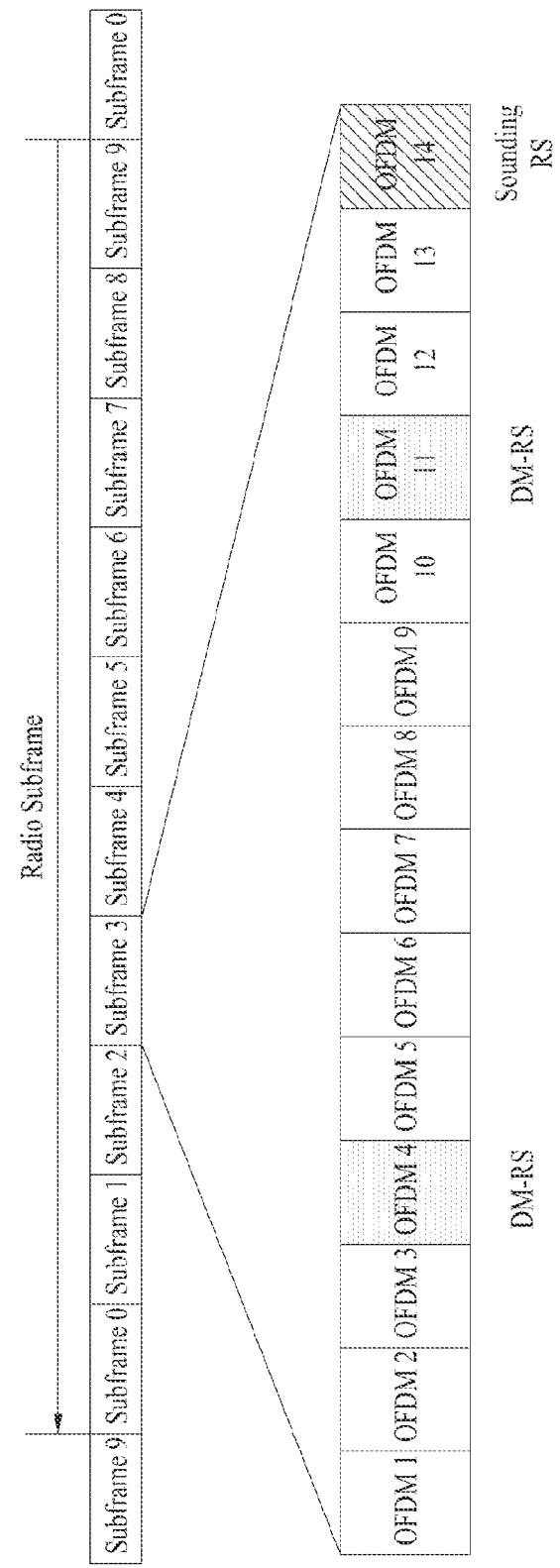
FIG. 7 illustrates an example of a radio frame structure in an uplink used in a 3GPP LTE system associated with the present invention.

FIG. 7 illustrates an example of a radio frame structure in an uplink generally used in a 3GPP LTE system.

Referring to FIG. 7, a demodulation reference signal (DM-RS) may be transmitted via two transmission symbols (for example, OFDM symbols or SC-FDMA symbols), and a sounding reference signal may be transmitted via one transmission symbol in a radio frame structure of a 3GPP LTE system. For example, in case of a normal cyclic prefix (normal CP) in a frame structure transmitted on a PUSCH, demodulation reference signals are mapped to fourth and eleventh OFDM symbols or SC-FDMA symbols, and the sounding reference signal is mapped to the last OFDM or SC-FDMA symbol of the relevant subframe, and the mapped signals are transmitted.

In the radio frame structure shown in FIG. 7, resources for channel sounding are provided for uplink channel measurement based on one antenna contained in user equipment.

However, when the number of transmitting antennas rapidly increases, or a root sequence which is one of sounding resources may not increase despite the need to transmit an increased number of sounding signals in an LTE-A system, a problem rises in which a resource space is not sufficient in transmitting the increased number of sounding reference signals. Specifically, if the relay time of a relay-cell uplink subframe and the time of a relay-uplink backhaul subframe are the same, a problem may occur in transmitting a sounding reference signal.

A need therefore exists for a novel sounding method that takes into consideration the sounding reference signal positioned in the last OFDM or SC-FDMA symbol. In case of a relay system, for instance, the number of sounding reference signals to be transmitted may increase, and the number of channel sounding channels being defined also needs to be increased. Meanwhile, in case of LTE-A user equipment, a sounding reference signal may be shared among multiple transmitting antennas, and therefore, it may take a long time to finish complicated channel measurement or a problem of deficiency of uplink user capacity may rise in the resultant LTE-A system.

The present invention has been made in view of the foregoing problems, and a method of transmitting a sounding reference signal according to one embodiment of the present invention, intends to propose a novel method of performing channel sounding for transmission of a sounding reference signal for multiple transmitting antennas in an LTE-A system, and a method of constituting and mapping resources accordingly.

1 Embodiment I (Channel Sounding Using DM-RS)

Figure 8:
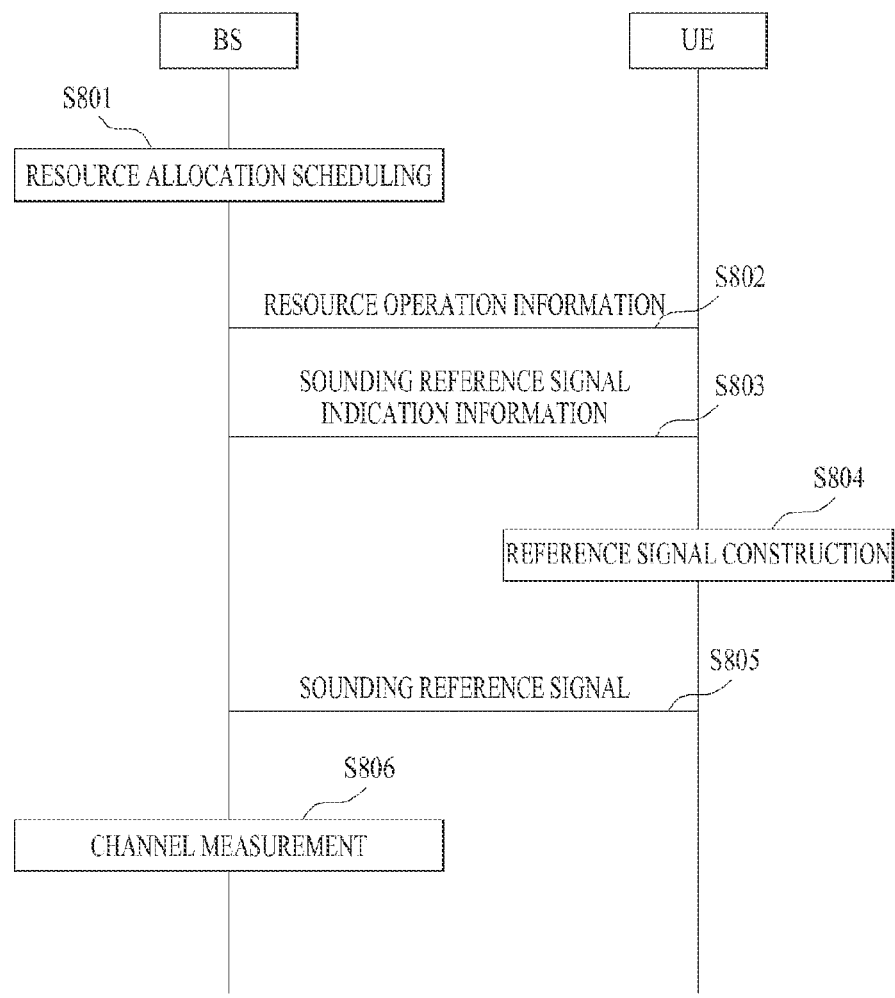
FIG. 8 illustrates an example of a sounding reference signal transmission process according to one embodiment of the present invention.

FIG. 8 illustrates an example of a sounding reference signal transmission process according to one embodiment of the present invention.

Referring to FIG. 8, a base station may perform various resource allocation scheduling for channel sounding (S801). Differently from conventional resource allocation for channel sounding, if there is a need for additional allocation of a resource for transmission of a sounding reference signal, the base station may perform resource allocation scheduling for channel sounding together with data transmission, or may schedule resource allocation for enabling utilization of a resource region for DM-RS or use of another data transmission channel. Resource allocation scheduling for channel sounding will be briefly described later through embodiments.

The base station then transmits resource operation information obtained in the resource allocation scheduling to user equipment (S802). The resource operation information may contain resource allocation information for channel sounding and/or resource allocation information for data transmission.

When resource allocation scheduling is performed to enable channel sounding to be performed using a resource for DM-RS, a sounding reference signal indicator which indicates whether to transmit a sounding reference signal through an allocated DM-RS resource region may be transmitted to the user equipment through the resource operation information or through additional signaling (S803). For example, when 1 bit is allocated to the sounding reference signal indicator, setting a bit value to '1' may indicate that the sounding reference signal is to be transmitted through the allocated resource for DM-RS. Setting the sounding reference signal indicator to '0' may indicate that the user equipment may transmit DM-RS through the resource for DM-RS as it was originally meant to.

When only a resource for DM-RS is allocated implicitly without allocating a data transmission resource, user equipment may transmit only a sounding reference signal using the resource for DM-RS without data transmission. When resource allocation scheduling is performed to enable channel sounding to be performed through a data channel, whether to transmit a sounding reference signal through an allocated resource region can be indicated by a sounding reference signal indicator.

The user equipment which has received resource operation information and a sounding reference signal may construct a relevant reference signal in accordance with the sounding reference signal indicator in a resource region for uplink transmission, allocated in accordance with the resource operation information (S804), and transmit the reference signal to the base station through an uplink channel (S805).

Then, the base station may perform channel measurement using the sounding reference signals transmitted from each user equipment (S806).

Hereinafter, a method of performing resource allocation scheduling for channel sounding according to one embodiment of the present invention will be described.

(1) Embodiment 1 (Resource Allocation for Channel Sounding)

A base station according to one embodiment of the present invention will need more sounding channels in the process of allocating an uplink resource, and may generate a new sounding channel if the number of sounding channels is not sufficient.

For example, the base station may perform, for data, channel dependent scheduling based on channel sounding, and may perform, for a sounding reference signal, non-channel dependent scheduling in which only the bandwidth required for the sounding reference signal is allocated.

To support a sufficient channel sounding bandwidth, resources may be allocated through an overall broadband of a system, and the result of channel sounding may be used in a subsequent resource allocation. As resource allocation may be performed in a dynamic or semi-dynamic manner, resource allocation for channel sounding may be determined according to resource allocation type. For instance, in case of dynamic resource allocation, a base station may completely perform scheduling for resource allocation, and therefore, additional processes for resource allocation for a sounding reference signal are not required.

On the contrary, semi-dynamic resource allocation may be performed slowly, and might require additional processes.

For example, a resource region may be predefined to enable distributed resource allocation to be used in channel sounding. With regard to this, resource allocation for user equipment or a relay should be basically distributed, however, a distributed resource pattern may be additionally defined when resource allocation is localized. Alternatively, resource allocation may be localized as long as the distributed resource pattern is defined.

Resource allocation for channel sounding according to one embodiment of the present invention may use the whole or a portion of a predetermined resource region (for example, previously used resource region). For example, resource allocation for channel sounding may use the whole or a portion of the resource region allocated for data transmission. User equipment may transmit a demodulation reference signal (DM-RS) for data demodulation together with uplink data through a PUSCH in the process of transmitting uplink data.

(2) Embodiment 2 (Channel Sounding Constitution According to Resource Allocation)

Resource allocation for channel sounding according to another embodiment of the present invention may utilize a conventional resource allocation method for a sounding channel, with various modifications of parameters.

For example, if a resource allocation method for channel sounding, as in a conventional resource allocation method, is employed as a resource allocation method for a random sounding channel, an appropriate channel sounding time may be acquired using a sounding period and an offset. Moreover, parameters for channel sounding may be re-used in designating a transmission format or in designating DM-RS. In addition, a method of resource allocation for channel sounding according to another embodiment of the present invention may derive a new sounding period and sounding offset value based on conventional parameters associated with resource allocation for sounding channel, such as a frame transmission period or a broadcast channel period, allocation and designation of use of DM-RS on an allocated DM-RS OFDM symbol or SC-FDMA symbol, a method of selecting an available resource in an allocated resource region, and a transmission format in the selected resource, etc.

Component parameters for channel sounding according to embodiments of the present invention may be set as indirect cell-specific and user equipment-specific radio resource control (RRC) parameters, in case of being based on the configuration scheme of LTE Rel-8. This configuration may be implemented through implicit or direct upper layer signaling in case of semi-static signaling, or may be implemented via L1/L2 signaling in dynamic signaling.

An appropriate configuration of the sounding reference signal may be established by L1/L2 control signaling (for example, signaling designated for a user equipment-specific PDCCH downlink control information (DCI) format for uplink (UL) grant or designated for channel sounding).

(3) Embodiment 3 (Channel Sounding Through DM-RS Resource)

As shown in the radio frame structure of FIG. 6, resource allocation for channel sounding according to one embodiment of the present invention may allocate a resource for transmission of a sounding reference signal to the last OFDM or SC-FDMA symbol of a subframe, and additionally use a DM-RS resource region as a resource region for a sounding reference signal.

For this, a base station according to one embodiment of the present invention may perform resource allocation scheduling according to channel state in consideration of sudden degradation of link performance resulting from an increase in the number of times of sounding transmission.

Figure 11:
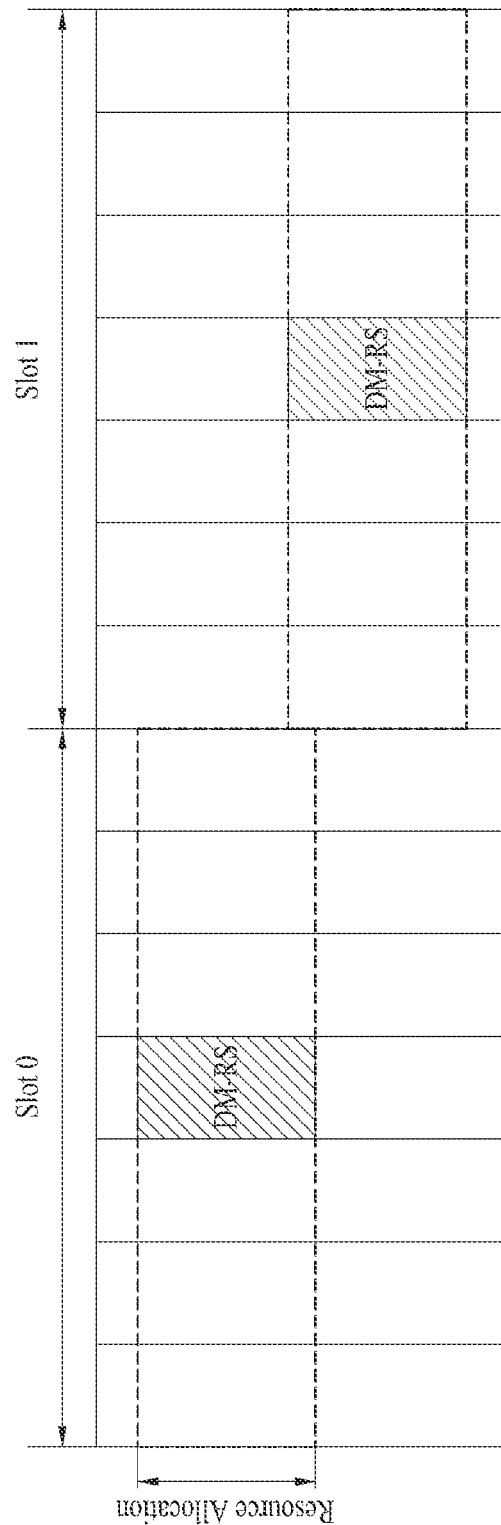
FIG. 11 illustrates another example of a resource region in which resource allocation for channel sounding is performed according to one embodiment of the present invention.

When the symbol required for channel sounding is only a DM-RS OFDM symbol or SC-FDMA symbol, the base station may allocate a resource for DM-RS to a relevant sounding reference signal transmitter (for example, user equipment) over a bandwidth for channel sounding. This is shown in FIG. 11.

When a plurality of DM-RS resources may be allocated in the same sub-band, the base station may perform resource allocation scheduling for a plurality of user equipments such that the user equipments may transmit respective sounding reference signals in the same OFDM or SC-FDMA symbol through the same DM-RS sub-band.

(4) Embodiment 4 (Channel Sounding Through a Plurality of DM-RS Resources)

According to still another embodiment of the present invention, the base station may perform resource allocation scheduling in consideration of the case where a plurality of DM-RSs exist in an uplink subframe. For instance, two DM-RSs may be transmitted through one subframe in an LTE system.

When a plurality of DM-RSs exist in an uplink subframe, the base station may multiplex the DM-RSs so as to increase the number of times of channel sounding and increase power gain. For example, in a subframe, a first DM-RS may be used in channel sounding for sub-band A, and a second DM-RS is used in channel sounding for sub-band B. Each DM-RS has a free DM-RS resource such as a sequence, cyclic shift or scrambling operation in the subframe to thereby increase the number of times channel sounding is performed using a DM-RS resource.

A method of multiplexing a plurality of user equipments and arranging the user equipments on DM-RS is optionally performed, and therefore, a single user equipment may use a single DM-RS or multiple DM-RSs. Here, power coupling, multiple antenna support or time diversity by multiple DM-RSs may be applied similarly to the bands to which DM-RSs are allocated, and the bands are differentiated for more flexible scheduling in a slot-hopped resource allocation environment.

As described above, when channel sounding is performed using each DM-RS, sounding references are pre-coded to achieve beamforming gain, and pre-coding matrices are differentiated for different DM-RS OFDM symbols or sub-bands.

(5) Embodiment 5 (Method of Supporting Multiple Antennas for Channel Sounding)

In case of supporting multiple transmitting antennas, the number of resources required for DM-RS may linearly increase when pre-coding is not performed. To support multiple transmitting antennas, a base station may allocate a plurality of available resources on the same DM-RS sub-band or different DM-RS sub-bands in time and frequency resource domains.

The channel sounding method according to one embodiment of the present invention allocates one or more transmitting antennas to a legacy sounding channel and allocates the rest of the transmitting antennas for the DM-RS resource so as to support multiple antennas through a DM-RS resource. The transmitting antennas to which DM-RS and the legacy sounding reference signal are allocated in the above-mentioned manner, respectively, may change during transmission trials.

For example, a sounding resource may be allocated as a DM-RS sounding resource on a legacy sounding channel. Then, a first transmitting antenna may use a legacy sounding channel during the period of first channel sounding, and may use a DM-RS sounding channel in accordance with a preset or predefined method of antenna rotation or antenna change. In this case, all antennas may have similar sounding quality after elapse of a predetermined time.

Meanwhile, when DM-RS pre-coding is applied as standards for an uplink MIMO transmission, the sounding method may use a general DM-RS which is not pre-coded, as information on an appropriate pre-coding vector used previously may be provided.

According to the above-described embodiments of the present invention, performance of sounding reference signals may increase in terms of the total number of times channel sounding is performed, and a new sounding position may be provided to a relay uplink backhaul subframe allocated to a macro cell uplink subframe together with a predetermined time offset.

2. Embodiment II (Method of Establishing Cyclic Shift for a Sounding Reference Signal)

Now, a method of establishing cyclic shift (CS) which is a DM-RS resource for a sounding reference signal when using DM-RS as a sounding reference signal according to aforementioned embodiments of the present invention, will be described.

According to one embodiment of the present invention, a cyclic shift value which is not used as an actual DM-RS resource, among the all cyclic shifts (for example, 12) available to DM-RS, may be used in the method of transmitting a sounding reference signal using a DM-RS resource according to aforementioned embodiments of the present invention. CS resources currently being used in an LTE system are shown in Table 3 and Table 4.

TABLE 3

| Cyclic shift field in DCI format 0 [3 bits] | DM-RS index ($n^{(2)}$DM-RS) |
| --- | --- |
| 000 | 0 |
| 001 | 6 |
| 010 | 3 |
| 011 | 4 |
| 100 | 2 |
| 101 | 8 |
| 110 | 10 |
| 111 | 9 |

TABLE 4

| Cyclic shift | DM-RS index ($n^{(1)}$DM-RS) |
| --- | --- |
| 0 | 0 |
| 1 | 2 |
| 2 | 3 |
| 3 | 4 |
| 4 | 6 |
| 5 | 8 |
| 6 | 9 |
| 7 | 10 |

Referring to Table 3 and Table 4, values that are not used in transmission of DM-RS among all 12 cyclic shifts are 1, 5, 7 and 11, and these values may be used as cyclic shift values for transmitting a sounding reference signal through a DM-RS symbol.

The above-described establishment scheme related to a sounding reference signal may be transmitted to user equipment through additional signaling for channel sounding, or may be transmitted in a user equipment-specific PDCCH DCI format through upper layer signaling or L1/L2 control signaling. Alternatively, 2-bits are allocated to indication information transmitted in step S803 of the embodiment described in FIG. 8, so as to designate any one of the four cyclic shifts which are not used in DM-RS transmission. For this, DM-RS mapping information and DM-RS values used in sounding reference signal transmission, shown in Table 3 and Table 4, should be preset in user equipment, or a base station should notify the mapping information through additional signaling.

Hereinafter, a resource region for transmitting a sounding reference signal through a DM-RS resource according to aforementioned embodiments of the present invention will be explained with reference to FIG. 9 to FIG. 11.

Figure 9:
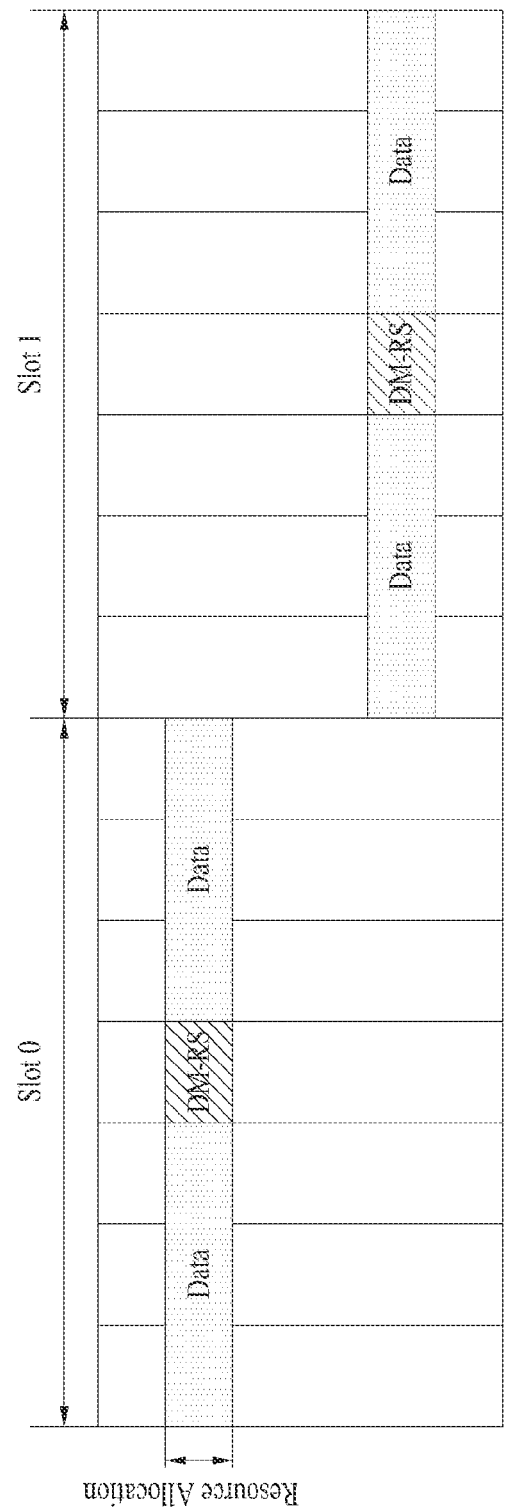
FIG. 9 illustrates an example of a resource region in which resource allocation for channel sounding is performed according to one embodiment of the present invention.

FIG. 9 illustrates an example of a resource region in which resource allocation for channel sounding is performed according to one embodiment of the present invention.

As shown in FIG. 9, one subframe has two slots, and resource allocation is performed in each predetermined region of each slot in accordance with an uplink channel which is employed to transmit a signal from user equipment to a base station.

Here, the base station may perform resource allocation scheduling such that the size of the allocated resource for data transmission is the same as the size of the bandwidth for DM-RS transmission. Here, the resource may be operated to perform channel sounding using a DM-RS resource. That is, the base station may perform channel sounding using the reference signal transmitted through a DM-RS resource region from the user equipment. Here, data is not necessarily transmitted through the resource region allocated for data transmission.

Figure 10:
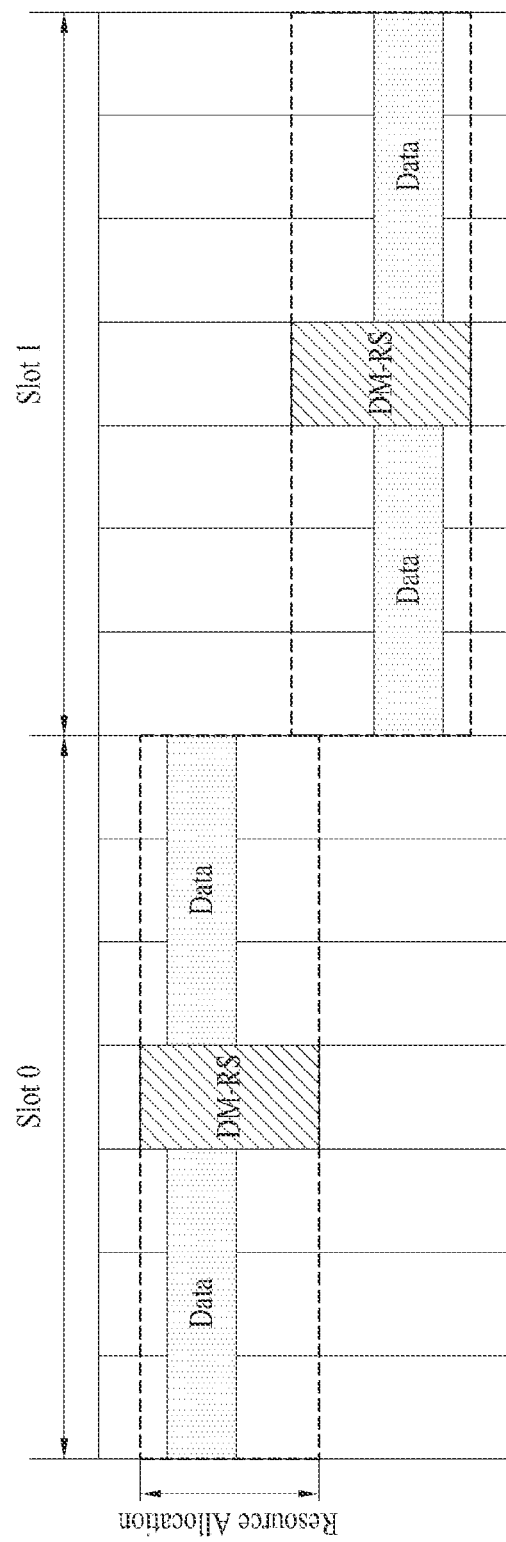
FIG. 10 illustrates another example of a resource region in which resource allocation for channel sounding is performed according to one embodiment of the present invention.

FIG. 10 illustrates another example of a resource region in which resource allocation for channel sounding is performed according to one embodiment of the present invention.

As shown in FIG. 10, one subframe has two slots, and resource allocation is performed in each predetermined region of each slot in accordance with an uplink channel which is employed to transmit a signal from user equipment to a base station.

Here, the base station may perform resource allocation scheduling such that the size of the allocated resource for data transmission is not the same as the size of the bandwidth for DM-RS transmission. Here, the remaining frequency resources among the frequency band for DM-RS may not be used in data transmission.

FIG. 11 illustrates still another example of a resource region in which resource allocation for channel sounding is performed according to one embodiment of the present invention.

Referring to FIG. 11, the base station according to one embodiment of the present invention may allocate only a resource region for DM-RS transmission, as a resource for sounding, without allocating a resource region for data transmission. That is, user equipment may transmit only a sounding reference signal to the base station through the resource for DM-RS without data transmission.

User equipment may transmit a sounding reference signal through a resource for DM-RS without data transmission, however, the base station will need a method for discriminating UEs in another domain when frequency resources partially overlap with each other between the UE that transmits only a sounding reference signal through a resource for DM-RS without data transmission and the UE that transmits DM-RS or a sounding reference signal through the resource for DM-RS with data transmission.

For discrimination between the UEs, different orthogonal cover codes, for example, Walsh codes={[00],[0,1]}, may be applied to each UE, such that DM-RS may be discriminated between the UEs in a DM-RS resource region being used by the UEs.

That is, different orthogonal cover codes are applied to the UEs when the base station allocates a resource in such a manner that frequency bands partially overlap with each other between the UE that transmits only a sounding reference signal through a resource for DM-RS and the UE that transmits DM-RS or a sounding reference signal through the resource for DM-RS with data transmission. This information is specific to the relevant UEs, and may be transmitted in L1/L2 control information, or be transmitted through upper layer signaling, that is, RRC signaling.

For this, the base station may select DM-RS information such as an individual sounding bandwidth, candidate cyclic shift and candidate route sequence, construct DM-RS resource allocation information, and transmit the DM-RS resource allocation information to the relevant user equipment prior to performing actual channel sounding. The DM-RS allocation information may be transmitted through upper layer signaling in a semi-dynamic manner or through L1/L2 signaling in a dynamic manner, through the above step S802 shown in FIG. 8, in which resource operation information is transmitted.

For example, when using dynamic DM-RS resource allocation, the base station may know information on the transmission mode in which sub-bands are used, and information on the DM-RS sequence transmitted through a relevant sub-band. Based on this, the base station may notify, through additional signaling, user equipment of the information that DM-RS resources (sequence, cyclic shift, DM-RS position or the like) may be used in channel sounding regardless of the operation of another user equipment. This information may be transmitted together with the sounding reference signal in the above step (S803) shown in FIG. 8, or transmitted through additional signaling.

3. Embodiment III (Resource Allocation for Sounding Reference Signal for Multiple Antennas)

According to another embodiment of the present invention, an SC-FDMA symbol, which may be used for channel sounding in LTE wherein only a single antenna is adopted, is the last symbol in a subframe. In one subframe, each slot is occupied by one DM-RS symbol, resulting in two DM-RS symbols in total.

When sounding reference signals are transmitted from the respective slots in the same manner as DM-RSs are transmitted in accordance with the aforementioned embodiments of the present invention, the cyclic shift resource used in the sounding reference signal becomes twice that of a conventional resource allocated to the sounding reference signal as compared with the case in which one slot of a subframe is occupied by a DM-RS symbol. As the number of cyclic shift resources corresponding to one DM-RS symbol increases, interferences may increase, thus degrading the performance of channel measurement.

As an example of the method of transmitting a sounding reference signal using DM-RS according to embodiments of the present invention, the DM-RS symbol in one slot of a subframe may be used alone to perform channel sounding for each antenna. This will be explained with reference to Table 5 and Table 6, in which the number of cyclic shifts of DM-RS in slots of a subframe for each antenna is shown.

TABLE 5

|  | Slot 0 | Slot 1 |
|---|---|---|
| $1^{st}$ antenna | CS #m | — |
| $2^{nd}$ antenna | — | CS #m |
| $3^{rd}$ antenna | CS #n | — |
| $4^{th}$ antenna | — | CS #n |

TABLE 6

|  | Slot 0 | Slot 1 |
|---|---|---|
| $1^{st}$ antenna | — | CS #m |
| $2^{nd}$ antenna | CS #m | — |

TABLE 6-continued

|  | Slot 0 | Slot 1 |
|---|---|---|
| $3^{rd}$ antenna | — | CS #n |
| $4^{th}$ antenna | CS #n | — |

In Table 5 and Table 6, m and n which represent values of cyclic shifts may have any one value of {0, 1, 2, 3, ... 11}, and, as mentioned above, may use cyclic shift values {1, 5, 7, 11} which are not used as a DM-RS resource. When the base station sets cyclic shift values for DM-RS, differently from Table 3 and Table 4, DM-RS values that may be used for channel sounding may also change. In addition, antenna indexing for allocating cyclic shifts may also be changed. For example, referring to Table 5, cyclic shift allocated to a first antenna may be CS #n not CS #m.

When sounding reference signals are transmitted from each slot in the same manner as DM-RS is transmitted in accordance with one embodiment of the present invention, a scheme may be employed in which sounding reference signals are transmitted from the respective slots of a subframe while avoiding increase in a cyclic shift resource. For example, orthogonal cover codes (OCC) may be applied to a resource for a sounding reference signal. This will be explained with reference to Table 5 and Table 6.

TABLE 7

|  | Slot 0 | Slot 1 | OCC index |
|---|---|---|---|
| $1^{st}$ antenna | CS #m | CS #m | 0 |
| $2^{nd}$ antenna | CS #n | CS #n | 1 |
| $3^{rd}$ antenna | CS #m | CS #m | 0 |
| $4^{th}$ antenna | CS #n | CS #n | 1 |

TABLE 8

|  | Slot 0 | Slot 1 | OCC index |
|---|---|---|---|
| $1^{st}$ antenna | CS #m | CS #m | 0 |
| $2^{nd}$ antenna | CS #n | CS #n | 0 |
| $3^{rd}$ antenna | CS #m | CS #m | 1 |
| $4^{th}$ antenna | CS #n | CS #n | 1 |

When channel variation between two slots of a subframe is not large, channel measurement accuracy may be improved owing to sound reference signal averaging between the two slots.

In Table 7 and Table 8, m or n may have any one of {0, 1, 2, 3, ..., 11}, and as mentioned above, may use cyclic shift values which are not used as a DM-RS resource. Alternatively, m or n may use only cyclic shift values 1, 5, 7 and 11 which are not used as a DM-RS resource.

In addition, antenna indexing for allocating cyclic shifts to the respective slot may also be changed. For example, referring to Table 5, cyclic shifts which correspond to the respective slot 0 and slot 1 for the first antenna, may be CS #n not CS #m.

Now, a base station and user equipment for performing the above-described embodiments of the present invention will be explained with reference to FIG. 12.

FIG. 12 is a block diagram illustrating a base station and user equipment for performing embodiments of the present invention.

The user equipment may operate as a transmitter in an uplink and operate as a receiver in a downlink. The base station may operate as a receiver in an uplink and operates as a transmitter in a downlink. That is, the user equipment and the base station may include both a transmitter and a receiver for transmission of information or data.

Each of the transmitter and the receiver may include a processor, module, unit and/or means for performing embodiments of the present invention. Specifically, each of the transmitter and the receiver may include a module (means) for encrypting a message, a module for interpreting the encrypted message, an antenna for transceiving the message, etc.

Referring to FIG. 12, the left side shows the structure of the transmitter, i.e., the base station, and the right side shows the structure of the receiver, i.e., the user equipment which has entered the cell served by the base station. The transmitter and the receiver may include respective antennas 1201 and 1202, receiving modules 1210 and 1220, processors 1230 and 1240, transmitting modules 1250 and 1260 and memories 1270 and 1280.

Each of the antennas 1201 and 1202 is constituted by a receiving antenna that receives a wireless signal from an external source and transmits the received signal to the receiving modules 1210 and 1220, and a transmitting antenna which transmits the signal generated from the transmitting modules 1250 and 1260 to the outside. Two antennas 1201 and 1202 or more may be employed in a MIMO system that uses multiple antennas.

The receiving modules 1210 and 1220 may perform decoding and demodulating operations on the wireless signal received from an external source through the antennas, restore the signals to the original data format, and transmit the restored signals to the processors 1230 and 1240. The receiving modules 1210 and 1220 and the antennas 1201 and 1202 may be integrated into a receiving unit for receiving a wireless signal, instead of being separated, as shown in FIG. 12.

Typically, the processors 1230 and 1240 may control the overall operation of the transmitter or the receiver. Specifically, the processors may perform functions such as a controller function, a medium access control (MAC) frame controller function for controlling MAC frames in accordance with service characteristics and radio wave environment, a handover function, an authentication and encryption function, etc.

The transmitting modules 1250 and 1260 may perform coding and modulating operations on the data to be scheduled by the processors 1230 and 1240 and transmitted to the outside, and transmit the data to the antennas. The transmitting modules 1250 and 1260 and the antennas 1201 and 1202 may be integrated into a transmitting unit for transmitting a wireless signal, instead of being separated, as shown in FIG. 12.

The memories 1270 and 1280 may store programs for processing and controlling operations of the processors 1230 and 1240, or temporarily store input/output data (in the case of a mobile terminal, uplink (UL) grant allocated from a base station, system information, station identifier (STID), flow identifier (FID), operating time, etc.)

In addition, the memories 1270 and 1280 may include at least one of storage media such as a flash memory, hard disk memory, micro multimedia card memory, card memory (for example, SD or XD memory), random access memory (RAM), static random access memory (SRAM), read-only memory (ROM), electrically erasable programmable read-only memory (EEPROM), programmable read-only memory (PROM), magnetic memory, magnetic disk and optical disc.

The processor 1230 of the transmitter controls the general operation of the base station, and controls the process of scheduling such that the resource allocation region for channel sounding contains the whole or a portion of the resource region allocated for transmission of the demodulation reference signal on a physical uplink shared channel (PUSCH), during resource allocation scheduling performed in accordance with the embodiment of the present invention described with reference to FIG. 8.

Resource allocation scheduling for channel sounding may be variously realized as described in the above Embodiments 1 to 5, and resource operation information related thereto may be transmitted to a receiver via the transmitting module 1250. For example, resource allocation scheduling may be performed such that the resource region allocated for transmission of two or more demodulation reference signals may be multiplexed into a resource region for channel sounding, or a resource region for data transmission may be selectively allocated in resource allocation for channel sounding.

Moreover, the processor 1230 may control the process of generating indication information indicating whether to transmit a sounding reference signal via a DM-RS resource, and transmitting the indication information to the receiver through the receiving module 1250. The indication information may instruct the user equipment to transmit the demodulation reference signal or the sounding reference signal in the resource region allocated for the demodulation reference signal.

In addition, the processor 1230 of the transmitter may control a process of performing channel measurement using the sounding reference signal transmitted from the receiver.

The processor 1240 of the receiver controls the general operation of the user equipment. According to above-described embodiments of the present invention, the processor 1240 may control a process of mapping a sounding reference signal for channel sounding, to a DM-RS resource region or resource region for data transmission based on the resource operation information received from the transmitter via the receiving module 1220 and transmitting the mapped signal.

In this case, the processor 1240 may control a process of transmitting one or more sounding reference signals on a physical uplink shared channel (PUSCH) via the transmitting module in accordance with the resource operation information.

In addition, the processor 1240 may control a process of generating the demodulation reference signal or the sounding reference signal and transmitting the generated signal in accordance with the indication information received via the receiving module 1240, or may control a process of selectively transmitting uplink data during transmission of the sounding reference signals in accordance with whether the resource operation information contains resource region allocation information for data transmission.

The processors 1230 and 1240 may be configured to transmit the control information mentioned in the embodiments of the present invention through additional signaling not through a DM-RS resource. In the meantime, the base station may perform, through at least one of the aforementioned modules, a controller function, orthogonal frequency division multiple access packet scheduling, time division duplex packet scheduling and channel multiplexing function, medium access control (MAC) frame controller function of controlling MAC frames in accordance with service characteristics and radio wave environment, real-time high speed traffic control function, handover function, authentication and encryption function, packet modulation/demodulation for data transmission, high speed packet channel coding function, real-time modem control function, etc., or may further includes additional means, modules or units for performing the above-enumerated functions.

As described above, the detailed description of preferred embodiments of the present invention is provided to enable those skilled in the art to realize and implement the present invention. While the present invention has been shown and described with reference to certain embodiments thereof, it will be apparent to those skilled in the art that various modifications and variations can be made in the present invention without departing from the scope of the invention. For instance, those skilled in the art may combine the components of the embodiments of the present invention.

Therefore, the present invention is not limited to the embodiments described herein, but intends to provide the largest scope that enables the principles and novel features disclosed herein to be accomplished.

Industrial Applicability

Embodiments of the present invention are applicable to various wireless communication systems. As an example of the wireless access systems, there are $3^{rd}$ Generation Partnership Project (3GPP), 3GPP2 and/or Institute of Electrical and Electronic Engineers 802 (IEEE802.xx), etc. Embodiments of the present invention are applicable not only to the various wireless access systems but also to all technical fields that adopt the wireless access systems.

The invention claimed is:

1. A terminal in a wireless mobile communication system, comprising:
   a receiving module for receiving a wireless signal;
   a transmitting module for transmitting the wireless signal; and
   a processor for controlling a process of transmitting one or more sounding reference signals on a physical uplink shared channel (PUSCH) through the transmitting module in accordance with resource operation information which includes resource allocation information for channel sounding, received through the receiving module,
   wherein the processor controls a process of transmitting the sounding reference signals through a whole or a portion of a resource region allocated for transmission of a demodulation reference signal according to the resource operation information and indication information indicating whether to transmit the sounding reference signals, received through the receiving module.

2. The terminal according to claim 1, wherein the processor controls a process of generating and transmitting the demodulation reference signal or sounding reference signals in accordance with the indication information received through the receiving module.

3. The terminal according to claim 1, wherein the processor controls a process of selectively transmitting uplink data during transmission of the sounding reference signals in accordance with whether the resource operation information comprises resource region allocation information for data transmission.

4. A base station in a wireless mobile communication system, comprising:
   a receiving module for receiving a wireless signal;
   a transmitting module for transmitting the wireless signal; and
   a processor for controlling a process of scheduling an available resource region of the system, including resource allocation for channel sounding, generating resource operation information according to the resource region scheduling, and transmitting the resource operation information to a terminal through the transmitting module,
   wherein the processor controls a process of scheduling to enable a resource region allocated for channel sounding to include a whole or a portion of a resource region allocated for transmission of a demodulation reference signal on a physical uplink shared channel (PUSCH), and performing channel sounding using a sounding reference signal received from the terminal through the receiving module.

5. The base station according to claim 4, wherein the processor controls a process of generating indication information indicating whether to transmit a sounding reference signal, and transmitting the indication information to the terminal through the receiving module,
   wherein the indication information instructs the terminal to transmit the demodulation reference signal or the sounding reference signal in the resource region allocated for transmission of the demodulation reference signal.

6. The base station according to claim 4, wherein the processor controls a process of multiplexing a resource region allocated for transmission of two or more demodulation reference signals into a resource region for channel sounding.

7. The base station according to claim 4, wherein the processor controls a process of scheduling to selectively allocate a resource region for data transmission.

8. The base station according to claim 4, wherein the processor controls a process of channel sounding using the sounding reference signal received from the terminal through the receiving module.

* * * * *